(12) United States Patent
Geisler et al.

(10) Patent No.: US 9,683,718 B2
(45) Date of Patent: Jun. 20, 2017

(54) LIGHT DUCT ELBOW FOR DUCTED ILLUMINATION

(71) Applicant: 3M INNOVATIVE PROPERTIES COMPANY, St. Paul, MN (US)

(72) Inventors: Karl J. L. Geisler, St. Paul, MN (US); David G. Freier, St. Paul, MN (US); Thomas R. Corrigan, St. Paul, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 217 days.

(21) Appl. No.: 14/645,794

(22) Filed: Mar. 12, 2015

(65) Prior Publication Data

US 2016/0265744 A1    Sep. 15, 2016

(51) Int. Cl.
| | | |
|---|---|---|
| *F21V 7/00* | (2006.01) | |
| *F21S 8/08* | (2006.01) | |
| *F21V 8/00* | (2006.01) | |
| *F21W 131/103* | (2006.01) | |
| *F21Y 115/10* | (2016.01) | |

(52) U.S. Cl.
CPC ............ *F21V 7/0033* (2013.01); *F21S 8/086* (2013.01); *F21V 7/0008* (2013.01); *G02B 6/0096* (2013.01); *F21W 2131/103* (2013.01); *F21Y 2115/10* (2016.08)

(58) Field of Classification Search
CPC ...... F21V 7/0033; F21V 7/0008; F21S 8/086; F21W 2131/103; F21Y 2115/10; G02B 6/0096
USPC ........................................................ 362/297
See application file for complete search history.

(56) References Cited

U.S. PATENT DOCUMENTS

| | | | |
|---|---|---|---|
| 247,229 | A | 9/1881 | Wheeler |
| 1,837,091 | A | 12/1931 | Adams |
| 4,152,752 | A | 5/1979 | Niemi |
| 4,411,490 | A | 10/1983 | Daniel |
| 5,988,843 | A | 11/1999 | Handel |
| 6,149,289 | A * | 11/2000 | Kuramitsu ........... G02B 17/006 362/290 |
| 6,324,330 | B1 | 11/2001 | Stites |
| 7,113,684 | B1 | 9/2006 | Cianciotto |
| 2008/0239526 | A1 | 10/2008 | Takeda et al. |

(Continued)

FOREIGN PATENT DOCUMENTS

| | | |
|---|---|---|
| JP | 11025726 A * | 1/1999 |
| JP | 2008-287920 | 11/2008 |

(Continued)

OTHER PUBLICATIONS

English translation of JP H11-25726 (Jan. 29, 1999).*
PCT International Search Report for PCT/US2016/019311, mailed Jun. 8, 2016.

*Primary Examiner* — Anh Mai
*Assistant Examiner* — Hana Featherly

(57) ABSTRACT

A light duct elbow having two light conduits capable of transporting light along two different propagation directions. A light diverter is located between the light conduits and has a reflector for directing light along the light conduits. In the light duct elbow, a light ray propagating within a collimation angle in the first light conduit that intersects the reflector is diverted to a second light ray propagating within the collimation angle in the second light conduit.

18 Claims, 3 Drawing Sheets

(56) References Cited

U.S. PATENT DOCUMENTS

2012/0057350 A1* 3/2012 Freier .................... F21V 14/04
                                                          362/279
2013/0069532 A1  3/2013 Lanham et al.

FOREIGN PATENT DOCUMENTS

| WO | WO 2012/138503 | 10/2012 |
| WO | WO 2012/138595 | 10/2012 |
| WO | WO 2013/106365 | 7/2013 |
| WO | WO 2013/138054 | 9/2013 |
| WO | WO 2014/070495 | 5/2014 |
| WO | WO 2014/070498 | 5/2014 |
| WO | WO 2014/168823 | 10/2014 |

* cited by examiner

LIGHT DUCT ELBOW FOR DUCTED ILLUMINATION

BACKGROUND

Ducted illumination is a way of controlling, bending, and distributing remotely the spread of light from the light source through duct sections. The duct sections can be lined with an ultra-reflective mirror film to tunnel the light effectively throughout the entire length of the duct and then extract light by an opening. The extracted light is propagated out of the duct to provide for illumination. Ducted illumination can provide an advantage of using a single light source to illuminate multiple areas and locating the light source distant from the point of illumination.

A conventional standing lamp post, such as a street light, will illuminate one or more sides or branches with the same or different brightness intensity. The post uses one or more light sources placed on a point, such as the top of the post, to illuminate a target area of illumination. Accordingly, a need exists to incorporate ducted lighting with its associated advantages into lamp posts or other lighting fixtures.

SUMMARY

A light duct elbow, consistent with the present invention, includes a first light conduit capable of transporting light along a first propagation direction and a second light conduit capable of transporting light along a second propagation direction different from the first propagation direction. The second light conduit intersects the first light conduit to provide for contiguous transport of light from the first propagation direction to the second propagation direction. The light duct elbow also includes a light diverter, between the first and second light conduits, having a reflector disposed at a non-zero angle to the first propagation direction. In the light duct elbow, a first light ray propagating within a collimation angle of the first propagation direction that intersects the reflector is diverted to a second light ray propagating within the collimation angle of the second propagation direction in the second light conduit.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Embodiments of the invention involve a technique on distributing an even or percent amount of light in a ducted illumination system by the division of area from the duct where the light source is providing light for transport. Embodiments includes a light duct elbow having an output area greater than an input area. Light duct tee splitters for ducted illumination are described in PCT Patent Applications Publication Nos. WO 2012/138595 and WO 2012/138503, both of which are incorporated herein by reference as if fully set forth.

Figure 1:
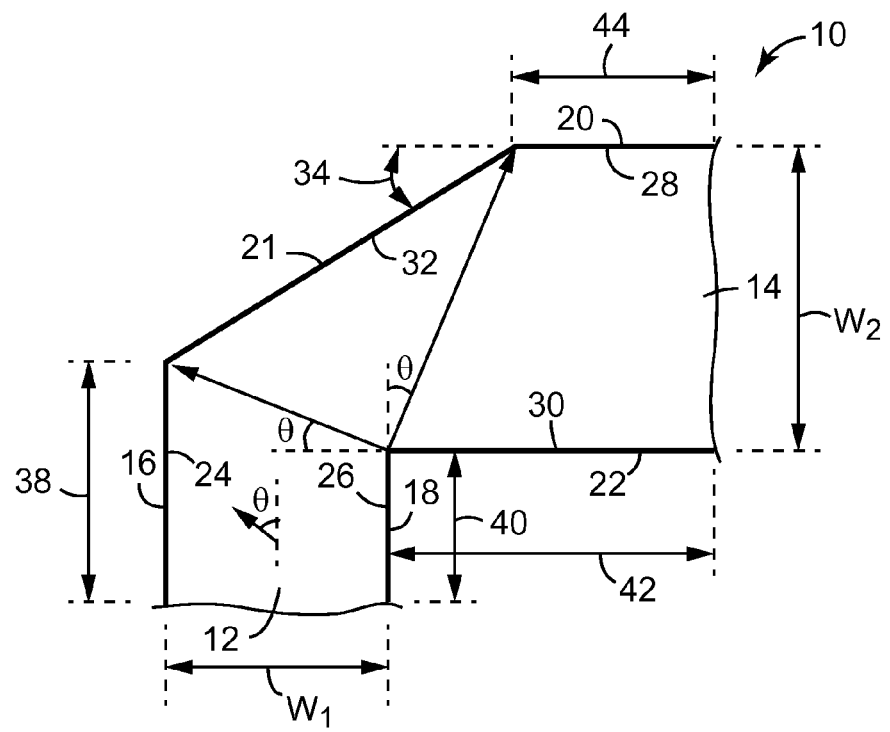
FIG. 1 is a side sectional view of a light duct elbow.
Figure 2:
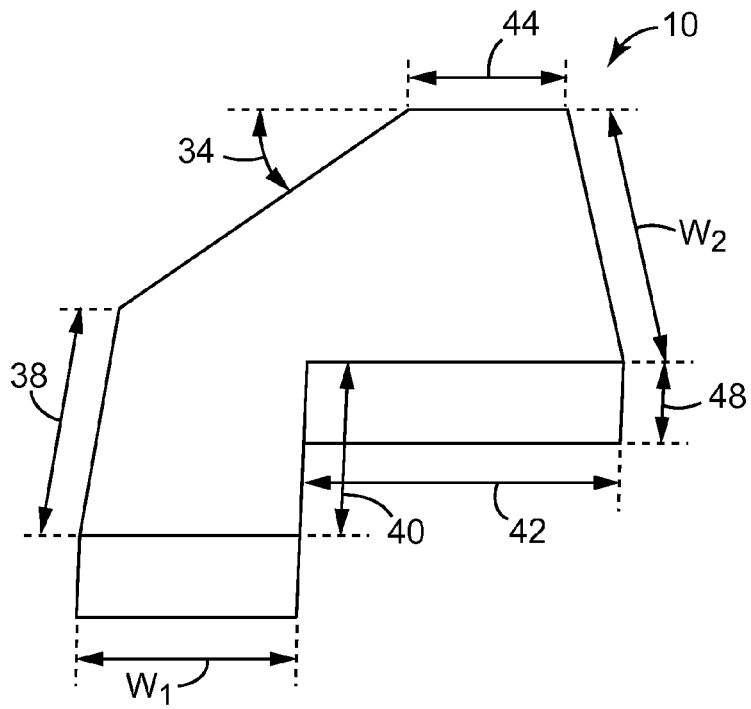
FIG. 2 is a perspective view of the light duct elbow of FIG. 1

FIGS. 1 and 2 are side sectional and perspective views, respectively, of a light duct elbow 10. Light duct elbow 10 includes a input light conduit 12 having sides 16 and 18, a output light conduit 14 having sides 20 and 22, and a diverter section having a side 21 between input light conduit 12 and output light conduit 14. The sides of input light conduit 12 have reflective inner surfaces 24 and 26, the sides of output light conduit 14 have reflective inner surfaces 28 and 30, and side 21 has a reflective inner surface 32 functioning as a reflector. Input light conduit 12 and output light conduit 14 generally have a square or rectangular cross-sectional shape, as illustrated in FIG. 2, with input light conduit 12 having a width $w_1$ and output light conduit 14 have a width $w_2$ according to the following formula (1) defining the relationship between those widths in an exemplary embodiment.

$$w_2 = w_1((1+\tan\theta)/(1-\tan\theta)), \text{ where } \theta = \text{collimation limit (half angle)} \quad (1)$$

This relationship can determine where the 45° reflector (mirror) can optimally be located relative the input and output light conduits. Table 1 provides data for the $w_1$ and $w_2$ relationship according to formula (1), where the data is normalized by setting $w_1=1$. As shown by the data in Table 1, the limit for collimation to reach 100% efficiency with a $w_2/w_1$ ratio of 2:1 is 18.43 degrees.

TABLE 1

| $w_1$ | $w_2$ | $\theta$ |
|---|---|---|
| 1 | 1 | 0 |
| 1 | 1.191754 | 5 |
| 1 | 1.428148 | 10 |
| 1 | 1.732051 | 15 |
| 1 | 1.999568 | 18.43 |
| 1 | 2.144507 | 20 |
| 1 | 2.747477 | 25 |
| 1 | 3.732051 | 30 |
| 1 | 5.671282 | 35 |
| 1 | 11.43005 | 40 |

In use, input light conduit 12 receives light from a light source, either directly at the input to light duct elbow 10 or via a light duct connected to input light conduit 12. Also in use, output light conduit 14 receives light from input light conduit 12 and distributes the light, either directly or via a light duct connected to output light conduit 14. An exemplary embodiment of light duct elbow 10 has the following dimensions: 3 inches for width $w_1$ of input light conduit 12; 4 inches for length 38 of side 24; 3 inches for length 40 of side 18; 5 inches for length 42 of side 22; 3 inches for length 44 of side 20; 6 inches for width $w_2$ of output light conduit 14; 3 inches for depth 48; and 45° for angle 34 between sides 20 and 21.

The light transported by light duct elbow 10 is typically collimated. Light duct elbow 10 provides for transportation of light from an input light conduit to an output light conduit while substantially maintaining a collimation angle of the transported light. In particular, a first light ray propagating within a collimation angle of a first propagation direction within the input light conduit that intersects the reflector is diverted to a second light ray propagating within the collimation angle of a second propagation direction in the output light conduit. This collimation angle can be between about 0 degrees and about 30 degrees, or between about 10 degrees and about 20 degrees, or 18.4 degrees.

Figure 3:
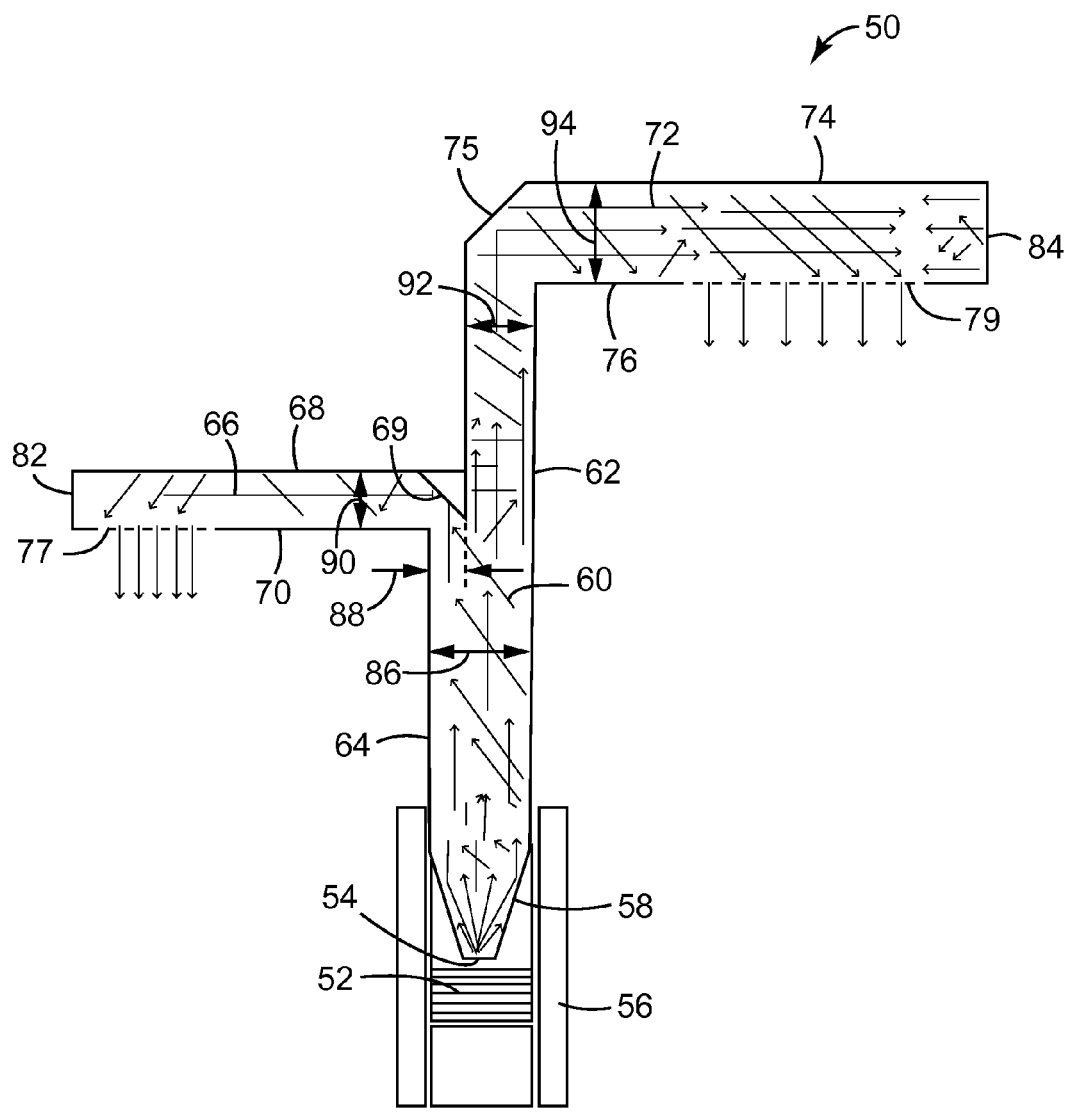
FIG. 3 is side sectional view of a ducted illumination system using light duct elbows.

FIG. 3 is side sectional view of a ducted illumination system 50 using light duct elbows having a configuration similar to light duct elbow 10. System 50 includes a post support 56 having a light source 54 and a thermal management section 52, such as heat sink fins, to cool light source 54. A light conduit 60 has sides 62 and 64 for transporting light generally along a longitudinal axis and angled sides 58 adjacent light source 54. Light conduit 60 receives light from light source 54, and the light can be collimated a particular amount via angled sides 58. A light conduit 66 has sides 68 and 70 for transporting light, a diverter section 69, and a termination mirror surface 82. Light conduit 66 receives light from light conduit 60 and distributes the light at a light output region via a light extraction area 77. A light conduit 72 has sides 74 and 76 for transporting light, a diverter section 75, and a termination mirror surface 84. Light conduit 72 receives light from light conduit 60 and distributes the light at a light output region via a light extraction area 79. Light extraction areas 77 and 79 can use features for redirecting light from the light ducts through the light output regions.

System 50 has the following configuration, consistent with light duct elbow 10, for distributing light via the two light duct elbows. Light conduit 60 has an overall width 86. A width 90 of light conduit 66 is twice the width 88 at the input to light conduit 66. A width 94 of light conduit 72 is twice the width 92 at the input to light conduit 72. System 50 thus has two branches of illumination in different heights. The width 86 (area) of the base duct is divided into two branches with each branch having a 45° angle mirror reflector to propagate the light effectively to each branch, light conduits 66 and 72. In both cases, the dimension of the branch is twice as large as the portion of the base duct feeding it in this exemplary embodiment. The widths of the input and output light conduits can be determined by formula (1) defining the relationship between input and output widths $w_1$ and $w_2$.

The following are exemplary components for implementing systems 10 and 50. The light source can be implemented with one or more light emitting diodes (LEDs). The light ducts and conduits can be implemented with sheet metal or other rigid material. The inner surfaces of the light ducts and conduits can be reflective by being polished metal, having a reflective coating such as silver, or being lined with a reflective film such as the Enhanced Specular Reflector (ESR) product from 3M Company. The diverters can have a mirror on their inner surfaces or otherwise have reflective inner surfaces. The light extraction areas can have optical films providing for light extraction, and the light output regions can be implemented with a planar or curved surface. The optical films can include turning films to direct light from the light conduits. The light output regions can be implemented with a transparent material or with voids or apertures in the light conduits, and the voids can have a varying areal density. The light conduit for receiving light from the light source can have an input section configured to collimate the light, for example a light collimating horn. Examples of light collimating horns are described in U.S. Provisional Patent Application Ser. No. 61/976,075, entitled "Light Horn Arrays for Ducted Lighting Systems," and filed Apr. 7, 2014, which is incorporated herein by reference as if fully set forth. A housing can optionally be used to enclose the light ducts and conduits, and the housing can be used for decorative purposes or to shield the light ducts and conduits from the environment when used in an outdoor setting.

Figure 4:
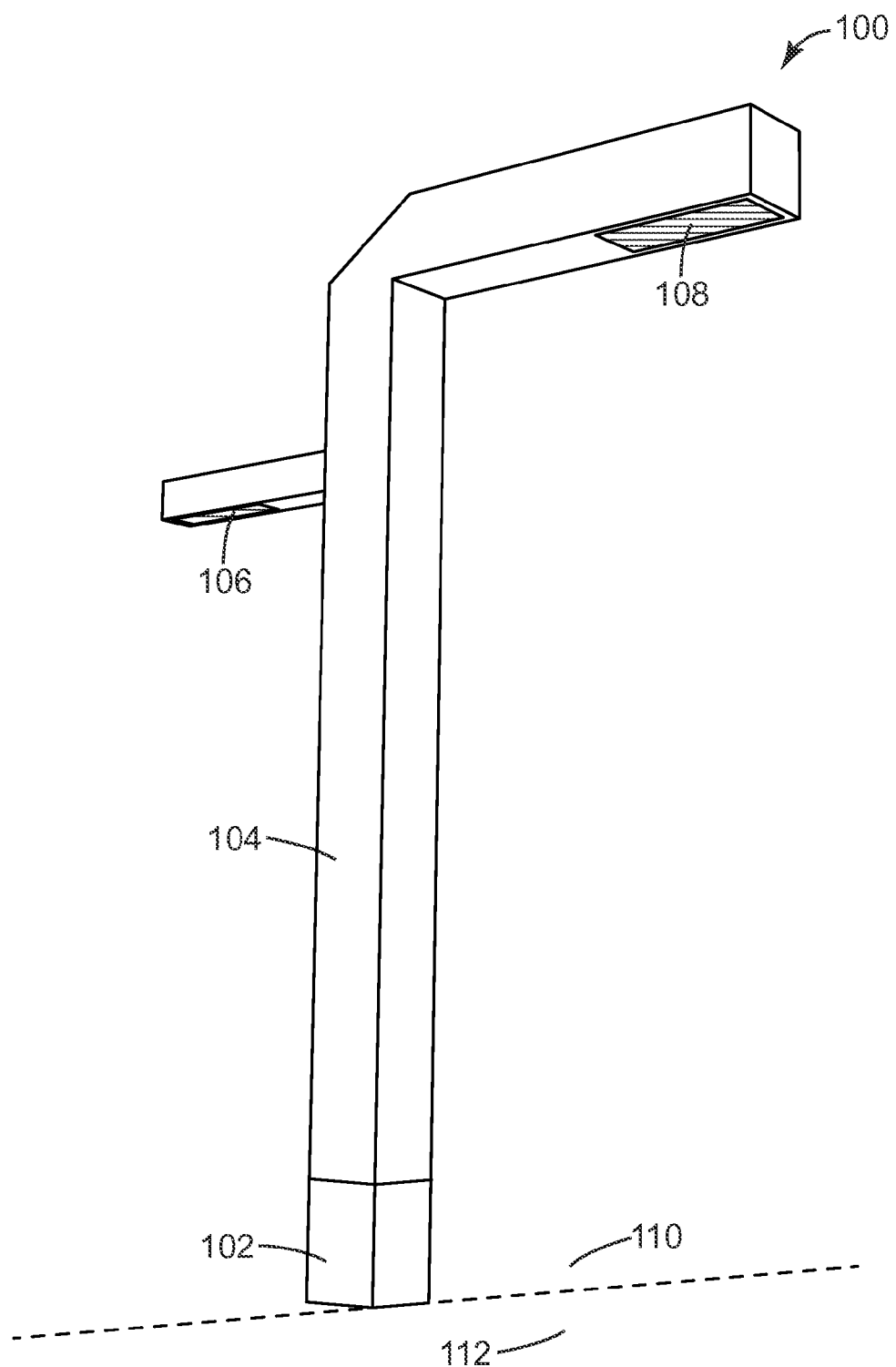
FIG. 4 is a perspective view of a lamp post light using ducted illumination.

FIG. 4 is a perspective view from the ground looking up at a lamp post 100 using ducted illumination. Lamp post 100 can have a configuration similar to system 50, for example. Lamp post 100 includes a light engine 102, for example an array of LEDs in a collimating horn. Light from light engine 102 is transported by light transport duct system 104 and distributed to illumination output surfaces 106 and 108. When lamp post 100 is used as a street light, for example, lamp post 100 can be positioned such that illumination output surface 106 illuminates a sidewalk area 110 and illumination output surface 108 illuminates a roadway area 112. In this integrated standing ducted illumination lamp post 100, the point of electrical connection would be easily accessible by being near the bottom of duct system 104. Lamp post 100 can also be easily maintained by servicing and replacing one light engine for multiple light outputs instead of having to replacing multiple light bulbs corresponding with each illumination output area. For example, replacing a light source in the bottom of duct system 104 can have a greater advantage on light engine replacement instead of having to service and replace bulbs on the top of the lamp post at the illumination outputs.

The invention claimed is:

1. A light duct elbow, comprising:
a first light conduit for transporting light along a first propagation direction;
a second light conduit for transporting light along a second propagation direction different from the first propagation direction, the second light conduit intersecting the first light conduit to provide for contiguous transport of light from the first propagation direction to the second propagation direction; and
a light diverter, between the first and second light conduits, comprising a reflector disposed at a non-zero angle to the first propagation direction,
wherein a first light ray propagating within a collimation angle of the first propagation direction that intersects the reflector is diverted to a second light ray propagating within the collimation angle of the second propagation direction in the second light conduit,
wherein the first light conduit has a first rectangular cross section and the second light conduit has a second rectangular cross section greater than the first rectangular cross section.

2. The light duct elbow of claim 1, wherein the non-zero angle is approximately 45 degrees, and the second propagation direction is perpendicular to the first propagation direction.

3. The light duct elbow of claim 1, wherein the first light conduit has a cross-sectional width $w_1$, the second light conduit has cross-sectional width $w_2$, and $w_2 = w_1 ((1+\tan \theta)/(1-\tan \theta))$, where $\theta$=collimation limit (half angle).

4. The light duct elbow of claim 1, wherein the collimation angle is between about 0 degrees and about 30 degrees.

5. The light duct elbow of claim 1, wherein the collimation angle is between about 10 degrees and about 20 degrees.

6. The light duct elbow of claim 1, wherein the collimation angle is about 18.4 degrees.

7. The light duct elbow of claim 1, further comprising a reflective film on inner surfaces of the first and second light conduits.

8. The light duct elbow of claim 1, wherein the reflector comprises a reflective film.

9. A luminaire, comprising:
a light duct having a longitudinal axis, a light input end, a light output end opposite the light input end, and a reflective interior surface;
a light duct elbow connected with the light output end of the light duct, comprising:

a first light conduit for transporting light along a first propagation direction;

a second light conduit for transporting light along a second propagation direction different from the first propagation direction, the second light conduit intersecting the first light conduit to provide for contiguous transport of light from the first propagation direction to the second propagation direction; and a light diverter, between the first and second light conduits, comprising a reflector disposed at a non-zero angle to the first propagation direction, wherein a first light ray propagating within a collimation angle of the first propagation direction that intersects the reflector is diverted to a second light ray propagating within the collimation angle of the second propagation direction in the second light conduit; and a light output region in the second light conduit, wherein the first light conduit has a cross-sectional width $w_1$, the second light conduit has a cross-sectional width $w_2$, and $w_2 = w_1 ((1 + \tan \theta)/(1 - \tan \theta))$, where $\theta$ = collimation limit (half angle).

10. The luminaire of claim 9, wherein the light output region includes a turning film that redirects the light away from the second light conduit.

11. The luminaire of claim 9, wherein the light output region comprises a planar surface.

12. The luminaire of claim 9, wherein the light output region comprises a curved surface.

13. The luminaire of claim 9, further comprising a light source for injecting light into the light duct through the light input end.

14. The luminaire of claim 13, wherein the light source comprises a collimating horn and a light emitting diode disposed to inject light into the collimating horn.

15. The luminaire of claim 9, further comprising another light conduit extending from the light duct on a side opposite the second light conduit and having a light output region in the another light conduit.

16. The luminaire of claim 9, further comprising a reflective film on inner surfaces of the light duct and the first and second light conduits.

17. A luminaire, comprising:

a light duct having a longitudinal axis, a light input end, a light output end opposite the light input end, and a reflective interior surface;

a light duct elbow connected with the light output end of the light duct, comprising:

a first light conduit for transporting light along a first propagation direction;

a second light conduit for transporting light along a second propagation direction different from the first propagation direction, the second light conduit intersecting the first light conduit to provide for contiguous transport of light from the first propagation direction to the second propagation direction; and a light diverter, between the first and second light conduits, comprising a reflector disposed at a non-zero angle to the first propagation direction, wherein a first light ray propagating within a collimation angle of the first propagation direction that intersects the reflector is diverted to a second light ray propagating within the collimation angle of the second propagation direction in the second light conduit; and a light output region in the second light conduit, wherein the light output region comprises a plurality of voids disposed in the second light conduit.

18. The luminaire of claim 17, wherein the plurality of voids includes an areal density that varies along the longitudinal axis.

* * * * *